(12) United States Patent
Zimmermann et al.

(10) Patent No.: US 8,979,205 B2
(45) Date of Patent: Mar. 17, 2015

(54) SEAT ASSEMBLY HAVING A CROSS MEMBER

(75) Inventors: Matthias Zimmermann, Munich (DE); Karsten Mueller, Ingolstadt (DE); Timo Schroeder, Ebersberg (DE); Inko Eberhardt, Pfaffenhofen (DE); Vaibhav Tonge, Pune (IN)

(73) Assignee: Lear Corporation, Southfield, MI (US)

( * ) Notice: Subject to any disclaimer, the term of this patent is extended or adjusted under 35 U.S.C. 154(b) by 228 days.

(21) Appl. No.: 13/502,615

(22) PCT Filed: Jan. 13, 2011

(86) PCT No.: PCT/US2011/021065
§ 371 (c)(1),
(2), (4) Date: Apr. 18, 2012

(87) PCT Pub. No.: WO2011/088167
PCT Pub. Date: Jul. 21, 2011

(65) Prior Publication Data
US 2012/0223563 A1 Sep. 6, 2012

Related U.S. Application Data

(60) Provisional application No. 61/295,806, filed on Jan. 18, 2010.

(51) Int. Cl.
*B60N 2/48* (2006.01)
*B60N 2/68* (2006.01)

(52) U.S. Cl.
CPC .............. *B60N 2/682* (2013.01); *B60N 2/4802* (2013.01); *B60N 2/4817* (2013.01); *B60N 2002/4894* (2013.01); *B60N 2002/4897* (2013.01)

USPC ............ 297/452.18; 297/399; 297/410

(58) Field of Classification Search
USPC ............ 297/391, 452.18, 220, 397, 399, 401, 297/410
See application file for complete search history.

(56) References Cited

U.S. PATENT DOCUMENTS 4,372,609 A    2/1983    Boisset
4,577,904 A *   3/1986    Wiese et al. .................. 297/410

(Continued)

FOREIGN PATENT DOCUMENTS

CN    101456367 A    6/2009
CN    101468619 A    7/2009

(Continued)

OTHER PUBLICATIONS

German Patent & Trademark Office, Office Action for the corresponding German Patent Application No. 11 2011 100 271.8 dated Feb. 13, 2014.

(Continued)

*Primary Examiner* — David R. Dunn
*Assistant Examiner* — Timothy J Brindley
(74) *Attorney, Agent, or Firm* — Brooks Kushman P.C.

(57) ABSTRACT

A seat assembly having a seat back that includes a side frame member and a cross member. The cross member may have first and second support post openings for receiving a headrest support post. First and second sets of arcuate ribs may be disposed between the first and second support post openings. Members of the first set may be concave with respect to the first support post opening. Members of the second set may be concave with respect to the second support post opening.

20 Claims, 7 Drawing Sheets

(56) References Cited

U.S. PATENT DOCUMENTS

| | | | |
|---|---|---|---|
| 5,029,942 A | 7/1991 | Rink | |
| 5,529,379 A * | 6/1996 | Stocker | 297/410 |
| 5,713,634 A | 2/1998 | Koike | |
| 5,788,250 A | 8/1998 | Masters et al. | |
| 5,934,755 A * | 8/1999 | Halamish | 297/410 |
| 6,070,942 A | 6/2000 | Barton et al. | |
| 6,789,850 B1 * | 9/2004 | Hann | 297/391 |
| 6,802,565 B2 * | 10/2004 | Isaacson | 297/410 |
| 7,066,552 B2 * | 6/2006 | Yoshida | 297/452.18 |
| 7,581,792 B2 | 9/2009 | Saberan | |
| 2004/0084943 A1 | 5/2004 | Fisher | |
| 2005/0231019 A1 * | 10/2005 | Gryp | 297/452.18 |
| 2006/0001308 A1 | 1/2006 | Humer et al. | |
| 2006/0197366 A1 | 9/2006 | Saberan | |
| 2006/0273649 A1 | 12/2006 | Saberan | |
| 2008/0136240 A1 | 6/2008 | Matthews et al. | |
| 2009/0058166 A1 | 3/2009 | Boes | |
| 2009/0179474 A1 | 7/2009 | Reel | |

FOREIGN PATENT DOCUMENTS

| | | |
|---|---|---|
| DE | 102006061638 A1 | 7/2008 |
| FR | 2923764 A1 | 5/2009 |

OTHER PUBLICATIONS

Second Office Action for the corresponding Chinese Patent Application No. 201180005388.9, mailed Jun. 23, 2014.

* cited by examiner

SEAT ASSEMBLY HAVING A CROSS MEMBER

CROSS-REFERENCE TO RELATED APPLICATION

This application is a U.S. national phase of PCT Appln. No. PCT/US2011/021065, filed Jan. 13, 2011, which claims the benefit of U.S. provisional Appln. No. 61/295,806, filed Jan. 18, 2010, the disclosures of which are hereby incorporated by reference in their entirety.

BACKGROUND

Field

Embodiments of the present invention relate to seats and frame assemblies for seats.

SUMMARY

In at least one embodiment a seat assembly is provided. The seat assembly includes a seat back having a side frame member and a plastic cross member mounted to the side frame member. The cross member may have first and second support post openings for receiving a headrest support post. First and second sets of arcuate ribs may be disposed between the first and second support post openings. Members of the first set may be concave with respect to the first support post opening. Members of the second set may be concave with respect to the second support post opening.

In at least one embodiment a seat assembly is provided. The seat assembly includes a headrest support post and a seat back having a side frame member, a unitary cross member, and a latch wire. The cross member engages the side frame member and has a support post opening that receives the headrest support post and a latch slot disposed proximate the support post opening. The latch wire is configured to be moveably disposed within the latch slot. The latch wire is moveable between a first position in which the latch wire engages the headrest support post and a second position in which the latch wire is spaced apart from the headrest support post.

In at least one embodiment a seat assembly is provided. The seat assembly includes a frame assembly having a side member and a unitary plastic cross member disposed at an end of the side member. The cross member may include a first support post opening configured to receive a headrest support post that has a first notch. The cross member may also include a first flexible arm having a barb. The first flexible arm is configured to flex between a latched position in which the barb is disposed in the first notch to inhibit movement of the support post and an unlatched position in which the barb is spaced apart from the notch to permit removal of the support post from the support post opening.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
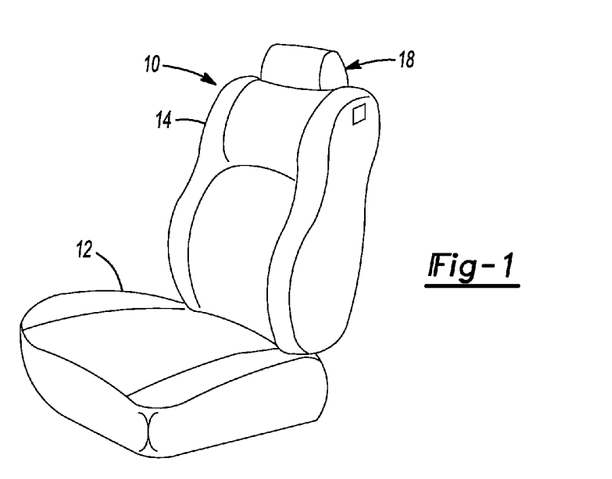
FIG. 1 is a perspective view of an exemplary seat assembly.
Figure 2:
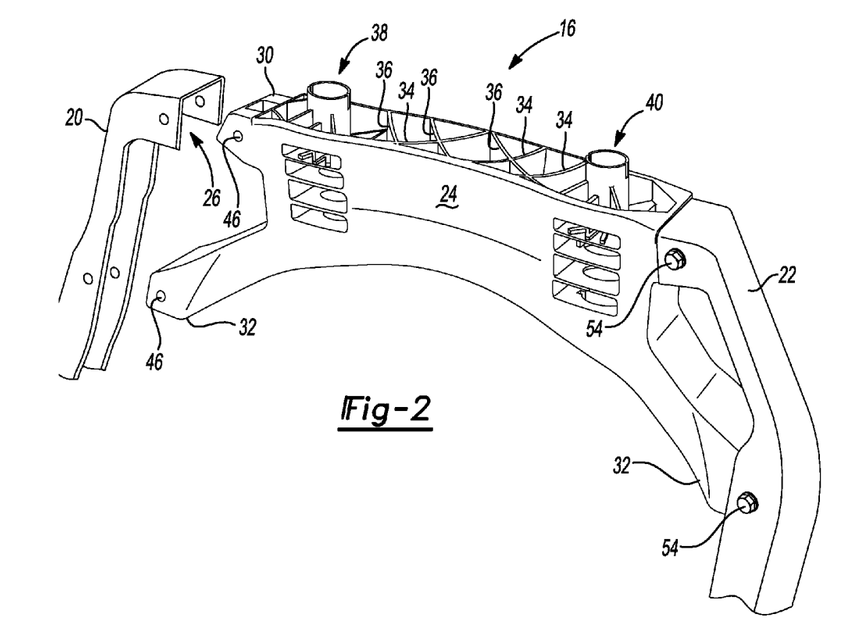
FIG. 2 is a partially exploded perspective view of a portion of a frame assembly having a cross member.

Referring to FIGS. 1 and 2, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a frame assembly 16. A headrest 18 that is configured to support the head of a seat occupant may be mounted on the frame assembly 16.

The frame assembly 16 may be configured to provide structural support for the seat back 14. In at least one embodiment, the frame assembly 16 may include a first side member 20, a second side member 22, and a cross member 24. The first and second side members 20, 22 may be spaced apart from each other and may generally extend away from the seat bottom 12 along opposing lateral sides of the seat back 14. The first and second side members 20, 22 may be made of any suitable material, such as a metal or metal alloy. The first and second side members 20, 22 may be configured with a channel or pocket 26 that may be configured to receive the cross member 24.

Figures 3, 4, 5:
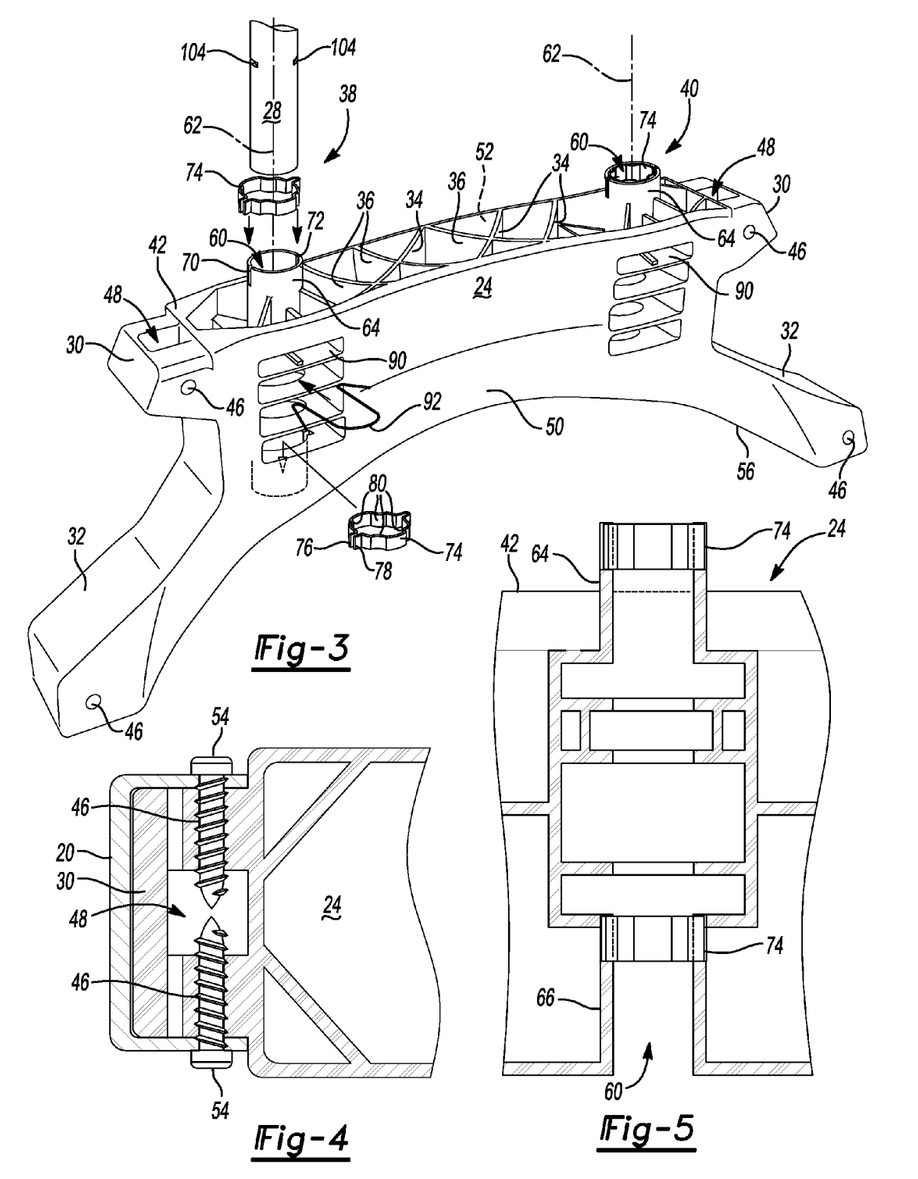
FIG. 3 is a perspective view of an embodiment of a cross member.
FIG. 4 is a top section view of a portion of the frame assembly.
FIG. 5 is a partial section view of the cross member of FIG. 3.

Referring to FIGS. 2-4, an exemplary cross member 24 is shown in more detail. The cross member 24 may have a unitary or one-piece construction. The cross member 24 may extend from the first side member 20 to the second side member 22 and may be disposed proximate the top of the frame assembly 16. As such, the cross member 24 may be configured to receive one or more support posts 28 that may couple the headrest 18 to the seat back 14. The cross member 24 may be made of a different material than the first and second side members 20, 22. For instance, the cross member 24 may be made of a polymeric material, which may reduce weight, facilitate component integration to reduce the number of individual parts, and eliminate welding steps as compared to a frame assembly having a metal cross member or a multi-piece construction.

The cross member 24 may include various features that facilitate assembly and/or structural integrity. In at least one embodiment, the cross member 24 may include one or more upper mounting portions 30, one or more lower mounting portions 32, a first set of arcuate ribs 34, a second set of arcuate ribs 36, a first support post mounting portion 38, and a second support post mounting portion 40. These features may be integrally formed with the cross member 24.

The upper and lower mounting portions 30, 32 may facilitate coupling of the cross member 24 to a side member 20, 22. In the embodiment shown, a pair of upper mounting portions 30 and a pair of lower mounting portions 32 are provided. The upper and lower mounting portions 30, 32 may be configured as arms that extend from a central body of the cross member 24 toward an associated side member 20, 22. The upper mounting portions 30 may be disposed proximate a top surface 42 of the cross member 24. The lower mounting portions 32 may be spaced apart from and disposed below the upper mounting portions 30. One upper mounting portion 30 and one lower mounting portion 32 may be configured to be mounted to the first side member 20 while the other upper mounting portion 30 and lower mounting portion 32 may be mounted to the second side member 22. In at least one embodiment, one upper and lower mounting portion 30, 32 may be received in the pocket 26 of the first side member 20 and the other upper and lower mounting portion 30, 32 may be received in the pocket 26 of the second side member 22.

The upper and lower mounting portions 30, 32 may include a through hole 46 and/or a cavity 48. The through hole 46 may extend from a first side or first surface 50 of the cross member 24 to a second side or second surface 52 disposed opposite the first surface 50. The cavity 48 may be disposed between and may be spaced apart from the first and second surfaces 50, 52. In at least one embodiment, the through hole 46 may be disposed proximate the midpoint of the through hole 46 and proximate the center of a mounting portion 30, 32.

Referring to FIG. 4, a fastener 54 may be used to couple each upper and lower mounting portion 30, 32 to a side member 20, 22. In FIG. 4, the fastener is not sectioned for clarity. In the embodiment shown, the fastener 54 is depicted as a bolt and nut, but may be a rivet, screw, or other type of fastener in various embodiments. The fastener 54 may extend through at least one hole in an associated side member 20, 22 and into the through hole 46. In the embodiment shown, two fasteners 54 are inserted through opposite sides of the side member 20 and extend to the cavity 48. The cavity 48 may provide access to assemble or rivet a fastener 54. Alternatively, a single fastener 54 may be provided that may extend completely through the through hole 46 from the first surface 50 to the second surface 52 and through associated holes in a side member 20, 22.

Referring to FIGS. 2 and 3, first and second sets of arcuate ribs 34, 36 are shown. Members of the first and second sets of arcuate ribs 34, 36 may extend from the top surface 42 of the cross member 24 at least partially toward a bottom surface 56 disposed opposite the top surface 42. Moreover, members of the first and second sets 34, 36 may extend from the first side or first surface 50 to the second side or second surface 52 of the cross member 24. The members of a particular set 34, 36 may be spaced apart from each other and curved with respect to a reference point. For instance, members of the first set 34 may be spaced apart from each other and may be curved with a concave configuration with respect to the first support post mounting portion 38. Similarly, members of the second set 36 may be spaced apart from each other and may be curved with a concave configuration with respect to a second support post portion 40. The sets of arcuate ribs 34, 36 may help distribute load forces exerted on the frame assembly 16 by a seat occupant. For instance, the ribs may help distribute load forces exerted on the cross member 24 in a region between the first and second support post mounting portions 38, 40 outward toward the first and second side members 20, 22. Moreover, each rib that is a member of the first set 34 may intersect at least one member of the second set 36 to help distribute load forces.

The first and second support post mounting portions 38, 40 may be provided with the cross member 24 and configured to receive a support post 28. In the embodiment shown, the first and second support post mounting portions 38, 40 are spaced apart from each other. Alternatively, a single support post mounting portion may be provided in one or more embodiments.

The first and second support post mounting portions 38, 40 may have similar or identical configurations. In the embodiment shown, the first and second support post mounting portions 38, 40 each include a support post opening 60 that may extend partially through the cross member 24 from the top surface 42 toward the bottom surface 56. The support post opening 60 may be disposed along an axis 62.

The support post opening 60 may be at least partially defined by one or more collars. As is best shown in FIGS. 3 and 5, a first collar 64 and a second collar 66 may be provided that are spaced apart from each other and may be coaxially disposed with respect to the axis 62. The first collar 64 may extend from and/or above the top surface 42 of the cross member 24. The second collar 66 may be spaced apart from the first collar 64 and may be disposed proximate the bottom surface 56 of the cross member 24. The collars 64, 66 may have first and second slots 70, 72. The first and second slots 70, 72 may be spaced apart from each other and may be disposed directly opposite each other in one or more embodiments.

A band 74 may be disposed in the support post opening 60. In FIG. 5, the band 74 is not sectioned for clarity. The band 74 may engage an associated collar 64, 66 and may be received by the first and second slots 70, 72. In at least one embodiment, the band 74 may have a ring-like configuration and may generally extend around and engage the support post 28 to account for tolerance variations and to inhibit rattling or vibration. In at least one embodiment, the band 74 may be made of a metal or metal alloy and may include a first end 76 and a second end 78. The first and second ends 76, 78 may be disposed in either the first slot 70 or the second slot 72. One or more indentations 80 may be provided on the band 74 that may extend toward and engage the support post 28. The indentations 80 may be spaced apart from each other and may be spaced apart from the cross member 24.

Figure 6:
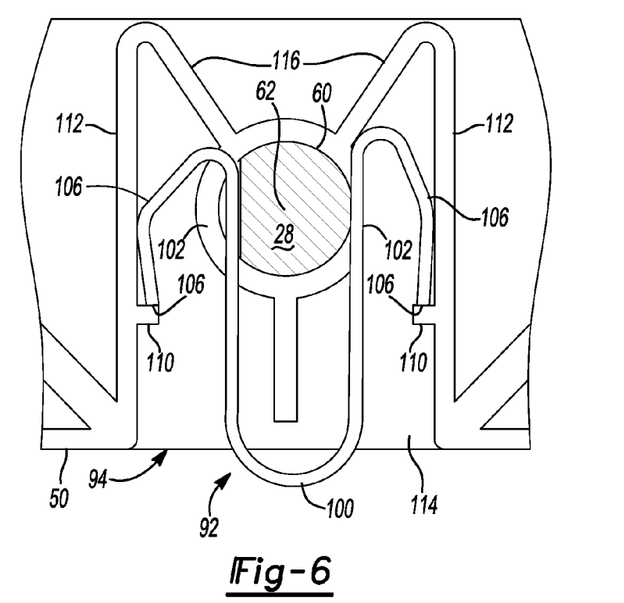
FIGS. 6 and 7 are plan views of a first embodiment of a support post latch in first and second positions, respectively.
Figure 7:
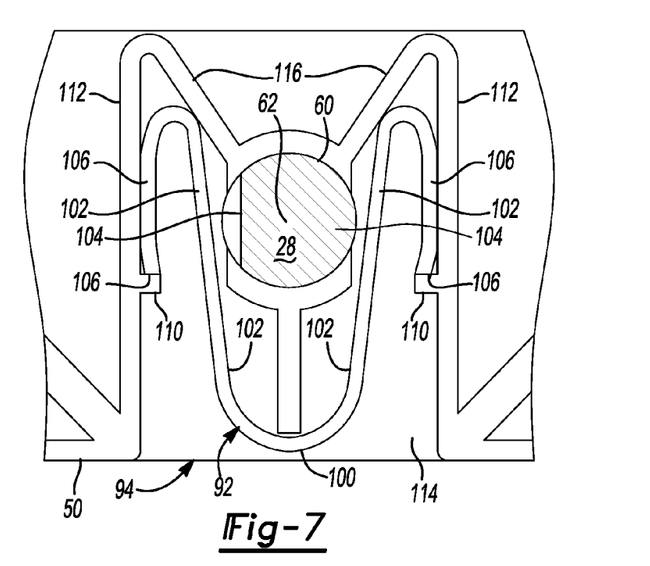

Referring to FIGS. 3, 6, and 7, at least one support post mounting portion 38, 40 may include a latch slot 90 that is configured to receive a latch wire 92. The latch slot 90 may include a latch slot opening 94 that may be disposed in the first surface 50 or the second surface 52. The latch wire 92 may be inserted through the latch slot opening 94 and may move between a first position and a second position.

In FIG. 6, the latch wire 92 is shown in the first position. In the first position, the latch wire 92 engages the support post 28 to inhibit movement. The latch wire 92 may include a contact portion 100 that may be engaged to actuate the latch wire 92 from the first position to the second position. In the embodiment shown, the contact portion 100 is curved and generally centered in the support post opening 60. One or more engagement portions 102 may extend from the contact portion 100 toward the support post 28. The engagement portions 102 may be received in a notch 104 in the support post 28 when in the first position. A retaining portion 106 may extend at an angle from an end of the engagement portion 102 and generally back toward the latch slot opening 94. In the embodiment shown, the retaining portion 106 includes a curved portion that extends from the engagement portion 102. The retaining portion 106 may have a shorter length than the engagement portion 102. An end 108 of the retaining portion 106 may engage a protrusion 110 that may extend from a side wall 112 and a base wall 114 that may at least partially define the latch slot 90. The end 108 of the retaining portion 106 may engage the protrusion 110 to retain the latch wire 92 in the latch slot 90 when the latch wire 92 is in the first position. In addition, the protrusion 110 may be generally aligned with a side of the support post opening 60 to help direct and/or increase pressure exerted by the latch wire 92 upon the support post as compared to a protrusion located closer to the support post opening 60. The side wall 112 may extend from the latch slot opening 94 toward an opposite side of the cross member 24, such as second surface 52.

In FIG. 7, the latch wire 92 is shown in the second position. In the second position, the latch wire 92 is spaced apart from the support post 28. More specifically, the contact portion 100 may be actuated toward the support post 28 when sufficient force is exerted upon the contact portion 100. The latch wire 92 may then flex such that the engagement portions 102 disengage the support post 28. In the embodiment shown, the engagement portions 102 move away from each other to disengage a notch 104. The curved part of the retaining portion 106 may slide along a wedge wall 116 that may extend at an angle from the side wall 112 toward the support post opening 60. In addition, the retaining portion 106 may be actuated toward and/or against the side wall 112 and the end 108 of the retaining portion 106 may move away from the protrusion 110. The latch wire 92 may be configured to return to the first position when sufficient force is not exerted to hold the latch wire 92 in the second position.

Figure 8:
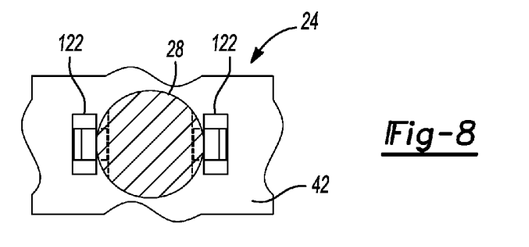
FIGS. 8 and 9 are top and side views of a second embodiment of a support post latch in a latched position.
Figure 9:
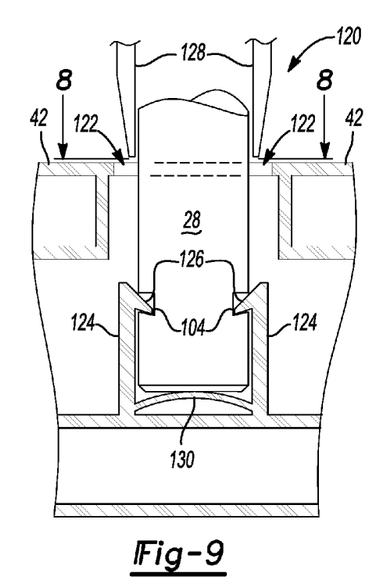
Figure 10:
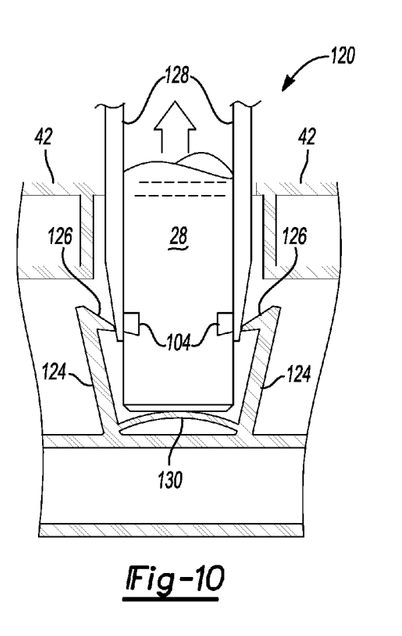
FIG. 10 is a side view of the second embodiment of the support post latch in an unlatched position.

Referring to FIGS. 8-10, a second embodiment of a support post mounting portion 120 is shown. In FIG. 9, the support post 28 is not sectioned for clarity. In this embodiment, the top surface 42 of the cross member 24 may include one or more tool slots 122 disposed proximate the support post opening 60. Each tool slot 122 may be aligned with a flexible arm 124 having a barb 126. In FIGS. 8-10, two flexible arms 124 are shown that are integrally formed with the cross member 24; however, a single flexible arm 124 may be provided in one or more embodiments. The barb 126 may be configured to engage an associated notch 104 in the support post 28 when in a latched position to inhibit movement or removal of the support post 28 from the support post opening 60 as shown in FIG. 9. The flexible arm 124 may flex to an unlatched position in which the barb 126 is spaced apart from the notch 104 to permit removal of the support post 28 from the support post opening 60 as shown in FIG. 10. A tool 128, such as a screwdriver, may be inserted through the tool slot 122 to flex the flexible arm 124 from the latched position to the unlatched position. In addition, a contact surface 130 may be disposed between the flexible arms 124 that may act as an end stop that engages an end of the support post 28 to position the support post 28. The contact surface 130 may have an arcuate configuration in one or more embodiments.

Figures 11, 12:
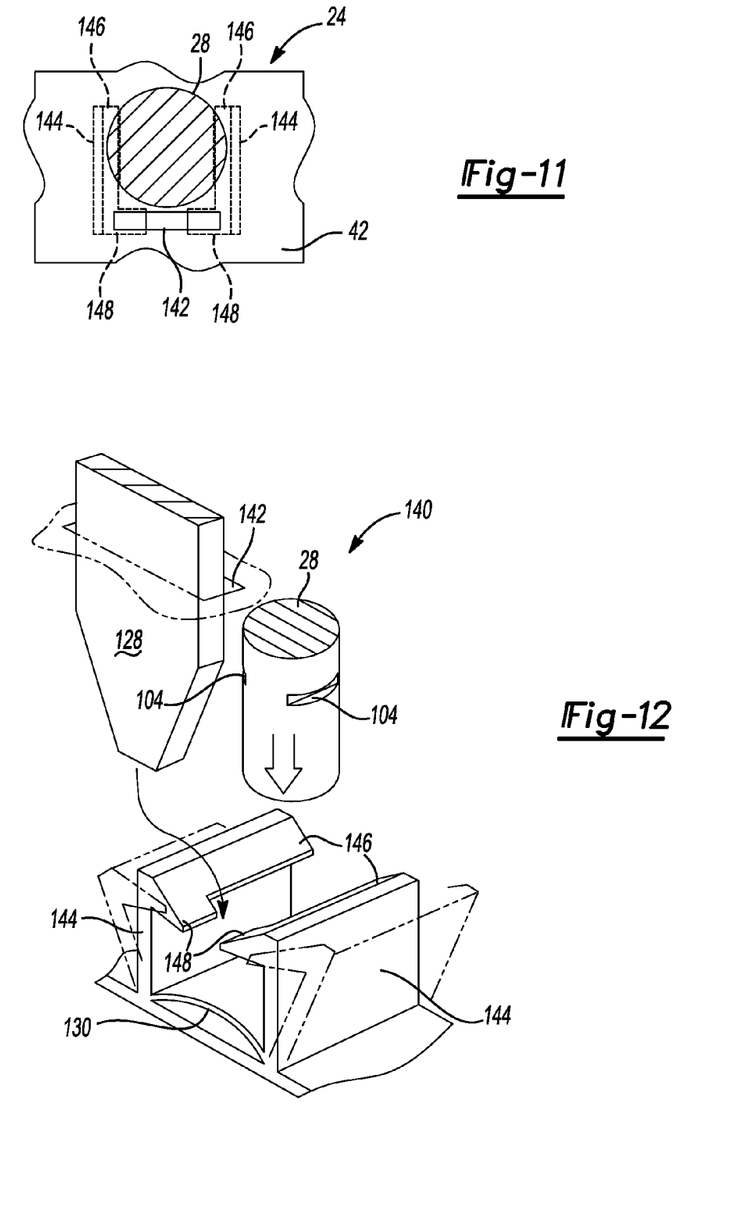
FIG. 11 is a top view of a third embodiment of a support post latch in a latched position.
FIG. 12 is an exploded perspective view of the third embodiment of the support post latch showing latched and unlatched positions.

Referring to FIGS. 11 and 12, a third embodiment of a support post mounting portion 140 is shown. In this embodiment, a single tool slot 142 is provided in the top surface 42 of the cross member 24. The tool slot 142 may be spaced apart from a flexible arm 144 having a barb 146 and a release tab 148. The release tab 148 may be located at an end of the flexible arm 144 and generally aligned with the tool slot 142. The release tabs 148 may extend toward each other and may be longer than the barbs 146. As such, the release tabs may 148 may be disposed closer to each other than the barbs 146. The barbs 146 may be configured to engage an associated notch 104 in the support post 28 when in a latched position to inhibit movement or removal of the support post 28 from the support post opening 60 as represented in solid lines in FIG. 12. The flexible arm 144 may flex to an unlatched position in which the barbs 146 are spaced apart from associated notches 104 to permit removal of the support post 28 from the support post opening 60 as shown in phantom in FIG. 12. A tool 128, such as a screwdriver, may be inserted through the tool slot 142 to engage the release tabs 148 and flex the flexible arms 144 from the latched position to the unlatched position.

Figure 13:
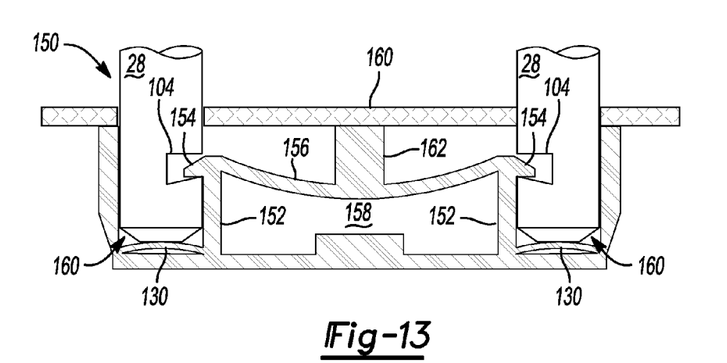
FIGS. 13 and 14 are side views of a fourth embodiment of a support post latch in latched and unlatched positions, respectively.
Figure 14:
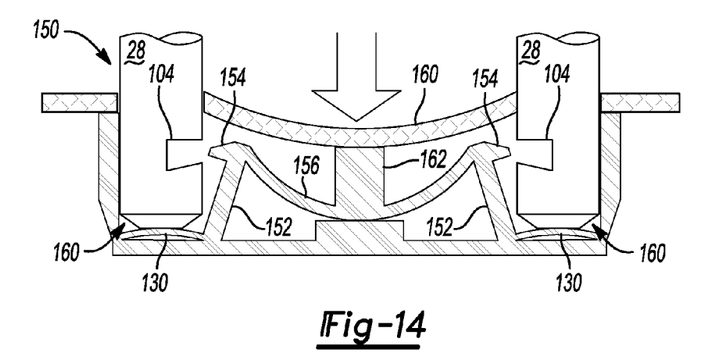

Referring to FIGS. 13 and 14, a fourth embodiment of a support post mounting portion 150 is shown. In this embodiment, two flexible arms 152 that each have a barb 154 may be provided to engage notches 104 on at least one support post 28. A connecting member 156 may be provided that extends between and connects the flexible arms 152. A gap 158 may be provided below the connection member 156 to allow the connecting member to flex away from a trim cover 160 or other flexible surface. The connection member 156 may also include a button portion 162 that may be disposed proximate the trim cover 160. The flexible arms 152 may move between a latched position shown in FIG. 13 and an unlatched position shown in FIG. 14. In the latched position, the barbs 154 may be configured to engage an associated notch 104 in the support post 28 to inhibit movement or removal of the support post 28 from the support post opening 60. The flexible arms 152 may flex to the unlatched position in which the barbs 154 are spaced apart from an associated notch 104 to permit removal of the support post 28 from the support post openings 60 when sufficient force is exerted in the connection member 156.

Figure 15:
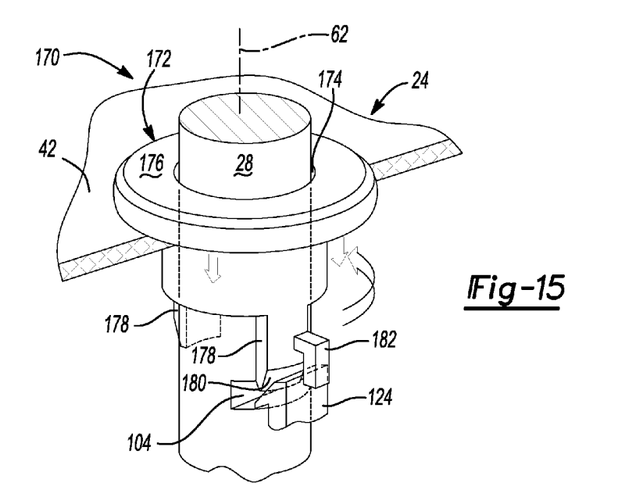
FIG. 15 is a perspective view of a fifth embodiment of a support post latch in a latched position.
Figure 16:
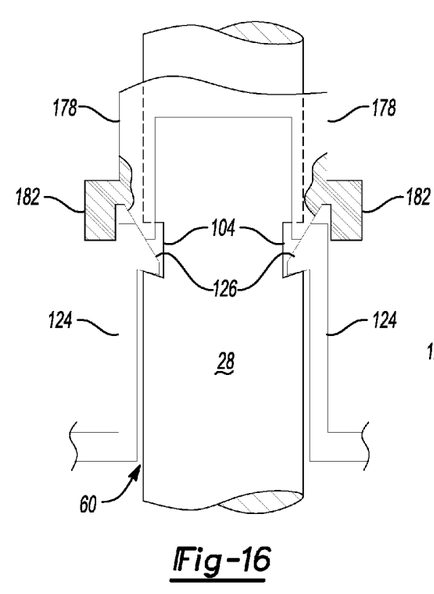
FIGS. 16 and 17 are side views of the fifth embodiment of a support post latch in latched and unlatched positions, respectively.
Figure 17:
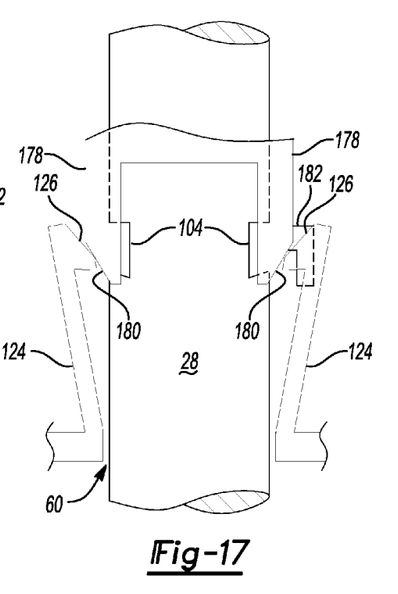

Referring to FIGS. 15-17, a fifth embodiment of a support post mounting portion 170 is shown. In this embodiment, a cap 172 is provided that may be disposed in the support post opening 60. The cap 172 may include a hole 174 through which the support post 28 may extend. The cap 172 may also include a flange 176 that may extend outward from the hole 174 and that may be disposed at a first end of the cap 172. One or more wedge arms 178 may extend from a second end of the cap 172 disposed opposite the first end and/or the flange 176. The wedge arms 178 may include an angled portion 180 that may be configured to engage and actuate a flexible arm 124. In addition, a hook 182 may be disposed on the cap 172. In the embodiment shown, the hook 182 extends from the wedge arm 178 and extends along a surface of the flexible arm 124 disposed opposite the barb 126.

The cap 172 may move between a latched position in which the flexible arm 124 engages and inhibits removal of the support post 28 and an unlatched position in which the flexible arm 124 flexes to permit removal of the support post 28. In FIG. 16, the flexible arm 124 is shown in an exemplary latched position. In this embodiment, the barb 126 may engage the notch 104 and the hook 182 may be disposed proximate a surface of the flexible arm 124 disposed opposite the barb 126. The hook 182 may be offset to a side of the wedge arm 178 to permit a portion of the wedge arm 178 to be aligned with the flexible arm 124 when the cap 172 is rotated to a position where the hook 182 is spaced apart from the flexible arm 124. As such, the hook 182 may inhibit the flexible arm 124 from flexing prior to rotation of the cap 172 even if the cap 172 is actuated downward toward the flexible arm 124.

In FIG. 17, the cap 172 is shown in an exemplary unlatched position. In this position, the cap 172 has been rotated about the axis 62 such that the hook 182 is not disposed proximate a surface of the flexible arm 124 disposed opposite the barb 126. The flexible arm 124 may flex when the cap 172 is actuated toward the flexible arm 124. For clarity, the hook 182 on the wedge arm 178 on the left side of FIG. 17 is not shown. In addition, the hook 182 may be omitted in one or more embodiments. If the hook 182 is omitted, then the cap 172 may be actuated toward the flexible arm 124 without rotation to flex the flexible arm 124 from the latched position to the unlatched position.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A seat assembly comprising:
a seat back having:
    a side frame member;
    a plastic cross member mounted to the side frame member, the cross member having first and second support post openings for receiving a headrest support post; and
    first and second sets of arcuate ribs disposed between the first and second support post openings, wherein members of the first set are concave with respect to the first support post opening, and members of the second set are concave with respect to the second support post opening.

2. The seat assembly of claim 1 wherein the cross member further comprises a mounting portion received in the side frame member.

3. The seat assembly of claim 2 wherein the mounting portion includes a through hole and a cavity disposed proximate a center of the mounting portion, wherein a fastener extends through the through hole to the cavity.

4. The seat assembly of claim 1 wherein the cross member includes a top surface and a collar that is disposed around the first support post opening and that extends above the top surface, the collar having first and second slots; and
    a spacer band disposed in the first support post opening and the first and second slots for engaging the headrest support post.

5. The seat assembly of claim 1 wherein the cross member includes a top surface, a first surface that extends from the top surface, and a second surface that extends from the top surface and that is disposed opposite the first surface, wherein each member of the first set intersects at least one member of the second set at a location that is disposed between and spaced apart from the first and second surfaces.

6. The seat assembly of claim 1 wherein each member of the first set is spaced apart from all other members of the first set and each member of the second set is spaced apart from all other members of the second set.

7. The seat assembly of claim 1 wherein the cross member includes a top surface, a first surface that extends from the top surface, and a second surface that extends from the top surface and that is disposed opposite the first surface, and wherein the first and second sets of arcuate ribs are arcuate in a direction that extends from the first surface toward the second surface.

8. A seat assembly comprising:
a headrest support post; and
a seat back having:
    a side frame member;
    a cross member that is disposed proximate the side frame member, the cross member having a support post opening that receives the headrest support post, and a latch slot disposed proximate the support post opening; and
    a latch wire that is moveably disposed within the latch slot, the latch wire being moveable between a first position in which the latch wire engages the headrest support post and a second position in which the latch wire is spaced apart from the headrest support post, wherein the latch wire includes a contact portion and first and second engagement portions that extend from the contact portion, wherein the first and second engagement portions move away from each other when the contact portion is actuated toward the headrest support post.

9. The seat assembly of claim 8 wherein the cross member includes a first surface having a latch slot opening, a second surface disposed opposite the first surface, a base wall that defines a portion of the latch slot, a side wall that extends from the base wall and extends from the first surface toward the second surface, and a wedge wall that extends at an angle from the side wall toward the support post opening.

10. The seat assembly of claim 9 wherein the latch wire slides along the wedge wall when the latch wire moves between the first position and the second position.

11. The seat assembly of claim 8 wherein the latch wire protrudes out of the latch slot opening when in the first position.

12. The seat assembly of claim 9 further comprising a protrusion that extends from the side wall, wherein an end of the latch wire engages the protrusion to retain the latch wire in the latch slot when the latch wire is in the first position.

13. The seat assembly of claim 8 wherein the cross member includes a first surface having a latch slot opening and first and second protrusions that are disposed between the latch slot opening and the headrest support post, wherein the latch wire further comprises a first retaining portion that extends from an end of the first engagement portion and a second retaining portion that extends from an end of the second engagement portion, wherein the first and second retaining portions engage the first and second protrusions, respectively, when the latch wire is in the first position.

14. A seat assembly comprising:
a headrest support post; and
a seat back having:
    a side frame member;
    a cross member disposed proximate the side frame member, the cross member having a support post opening that receives the headrest support post, a latch slot disposed proximate the support post opening, and a first surface having a latch slot opening; and
    a latch wire that is moveably disposed within the latch slot, the latch wire being moveable between a first position in which the latch wire engages the headrest support post and a second position in which the latch wire is spaced apart from the headrest support post, wherein the latch wire includes a contact portion, first and second engagement portions that extend from the contact portion, wherein the first and second engagement portions move away from each other when the contact portion is actuated toward the headrest support post, a first retaining portion that extends from an end of the first engagement portion, and a second retaining portion that extends from an end of the second engagement portion, wherein the first and second retaining portions extend toward the latch slot opening and the first and second engagement portions extend away from the latch slot opening.

15. The seat assembly of claim 14 wherein the first and second retaining portions move away from the support post opening when the latch wire is actuated from the first position toward the second position.

16. The seat assembly of claim 13 wherein the first and second retaining portions engage the first and second protrusions, respectively, when the latch wire is in the second position.

17. The seat assembly of claim 13 wherein the first and second engagement portions move away from the headrest support post and toward the first and second protrusions, respectively, when the latch wire moves from the first position to the second position.

18. The seat assembly of claim 13 wherein the cross member includes a second surface disposed opposite the first surface, a base wall that defines a portion of the latch slot, a first side wall that extends from the base wall and extends from the first surface toward the second surface, and a first wedge wall that extends at an angle from the side wall toward the support post opening, wherein the first retaining portion slides along the first wedge wall away from the support post opening when the latch wire is actuated from the first position toward the second position.

19. The seat assembly of claim 13 wherein the cross member includes a second wedge wall that extends at an angle from a second side wall toward the support post opening, wherein the second retaining portion slides along the second wedge wall away from the support post opening and the first retaining portion when the latch wire is actuated from the first position toward the second position.

20. The seat assembly of claim 7 wherein the cross member includes a bottom surface that is disposed opposite the top surface, wherein the first and second sets of arcuate ribs extend substantially linearly from the top surface toward the bottom surface.

* * * * *